United States Patent Office 3,377,367
Patented Apr. 9, 1968

3,377,367
PROCESS FOR ISOMERIZING UNSATURATED FATTY ACIDS OR DERIVATIVES THEREOF
Victor Lewis Larimer, Bloomington, Minn., assignor, by mesne assignments, to Ashland Oil and Refining Company, a corporation of Kentucky
No Drawing. Filed Mar. 22, 1965, Ser. No. 441,914
3 Claims. (Cl. 260—405.6)

ABSTRACT OF THE DISCLOSURE

Oleic acid is isomerized from the cis form to the trans form by contacting the same with silica gel in the presence of a small amount of water, at elevated temperatures.

---

The present invention relates to a process for isomerizing fatty materials which contain oleic acid or esters of oleic acid, and more particularly relates to the cis-trans isomerization of oleic acid and oleic acid esters.

The isomerization of naturally occurring fatty materials containing cis-oleic acid or cis-oleic acid esters to trans-oleic acid and trans oleic acid esters results in a substantial improvement in the utility of fatty materials isomerized in this manner. Thus the isomerization increases the melting point of the material containing the isomerized oleic acid or oleic ester and hence constitutes a hardening of the unsaturated oil while still retaining the polyunsaturates which have proven to be of value in food application. Fatty materials containing trans-oleic acid or trans-oleic acid esters furthermore have higher reactivities in drying oil applications. Soaps prepared from such trans-oleic acids have shown higher degrees of detergency. The isomerization of oleic acid and oleic acid esters to their trans-isomer is therefore of significant industrial importance.

It is an object of the present invention to provide a novel isomerization process for the cis-trans isomerization of fatty materials containing oleic acid or oleic acid esters. It is another object to provide novel catalysts for such cis-trans isomerizations. It is still another object of the present invention to provide a novel catalytic process for the isomerization of cis-oleic acid or oleic acid esters to trans-oleic acid or trans-oleic acid esters, which is economic and gives rise to a high yield of the isomerized oleic acid or oleic ester. Other objects of the present invention will become apparent from the following description and claim.

The isomerization processs of the present invention comprises contacting oleic acid, oleic acid esters, or fatty materials containing such with silica gel in the presence of up to 5%, by weight of the fatty material, of water at a temperature of 400° to 700° F.

The fatty materials employed in the present invention can be oleic acid or esters of oleic acid, such as $C_1$ to $C_{12}$ alkyl oleates, cycloalkyl oleates, or oleic acid glycerides, or can be mixtures of fatty saturated and unsaturated acids containing oleic acid as well as esters of such mixtures, such as particularly the vegetable seed or animal oils, e.g., soybean oil, cottonseed oil, olive oil, coconut oil, castor oil, peanut oil, rape seed oil corn oil, oitica oil, tung oil, linseed oil, perilla oil, lard oil, whale oil, and the like. The oleic acid glycerides can be mono-, di- or triglycerides. Mixed glycerides of oleic acid and other fatty acids can be employed as can mixtures of acids and esters. The fatty materials are in general aliphatic acids and esters thereof in which the acid radical has from 12 to 26 carbon atoms.

Silica gel is employed as the catalyst for the reaction. The term silica gel as employed in the present invention is intended to include only compositions consisting essentially of silica gel and water. Clays and other minerals are not satisfactory catalysts in the process of the present invention. Any commercially available silica gel can be employed in the process of the present invention. Such silica gels are normally prepared by reacting a solution of a water-soluble silicate such as sodium silicate with an acid such as HCl or $H_2SO_4$. A hydrogel is formed having about 10% silica and 90% water. The hydrogel is then washed and dried, e.g., in air at 225° F. for 48 hours, converting the same into a dry, hard gel.

As indicated hereinabove, the process is carried out in the presence of up to 5% by weight of the fatty material charged of water. It should be recognized that silica gel releases water when heated to the stated process temperatures and thus generally results in the presence of some water in the reaction mixture. However, it is generally preferred to add additional water such that the water concentration is from 0.1 to 5% by weight of the fatty material charged. The addition of water is particularly important in a continuous process. The concentration of the catalyst can be varied widely depending on the nature of the process. Thus, for a continuous process, the concentration of catalyst may be extremely high since the fatty material would be passed through a bed of the catalyst. In batch processes the catalyst concentration is generally within the range of 0.25 to 5% by weight of the fatty material charged, although both lower and higher concentrations can be employed.

The isomerization process of the present invention is generally carried out at temperatures of 400° to 700° F. Preferred reaction temperatures are in the range of 650° to 680° F. In batch processes the reaction pressure is autogenous while in continuous processes the pressure is maintained in the range of 300 to 500 p.s.i. It is however to be recognized that pressure is not an essential condition and that the process can be carried out at higher as well as lower pressures. Reaction times will vary depending on the reaction conditions and the starting material. Optimum reaction times as well as other reaction conditions are readily established experimentally. In general, reaction times of three to six hours are employed in batch processes.

The isomerization obtained by the process of the present invention is principally that of the cis-isomer to the trans-isomer. Some isomerization also results through shifting of the double bond. Undesirable methyl branching, which results when clays are used instead of the hydrated silica catalysts of the present invention, is substantially avoided. The dimerization of the starting material is low and lactone formation is also substantially avoided.

The isomerization process of the present invention is further illustrated by the following example:

EXAMPLE

Into a stainless steel 500 cc. pressure vessel were charged 400 g. of commercially available oleic acid, 12 g. of commercially available silica gel, and 12 g. of water. In addition to about 73.4% of oleic acid, the commercially available oleic acid contained about 1.5% of tetradecanoic acid, 13.3% of hexadecanoic acid, 2.2% of heptadecanoic acid, and about 8% of saturated acids. The reaction mixture was heated at 650° to 670° F. for a period of five hours, during which time the pressure increased from 80 p.s.i. to 475 p.s.i. The reaction product was distilled under vacuum at temperatures of 131° C. to 250° C. to result in 317.5 g. of fatty acids and 59.0 g. of residue constituting fatty acid dimer. Infrared analysis of the distillate indicated that substantially all of the cis-acid was converted to the trans-acid. No decarboxylation or lactone formation was found to have occurred. The acid value of the distillate was 197.2, the saponification value 204.5, and the iodine value 73.4.

The foregoing example illustrates the isomerization of commercially available oleic acid. Similar results are obtained if instead of the commercially available oleic acid, an alkyl oleate such as methyl oleate, ethyl oleate, isopropyl oleate, octyl oleate, dodecyl oleate, cyclohexyl oleate, or an oleic acid glyceride such as is found in vegetable seed oils, e.g., soybean oil, cottonseed oil, olive oil, and the like is charged. The beneficial results achievable through the use of trans-isomerized oleic acid and oleic acid esters instead of the naturally occurring cis-oleic acids and cis-oleic acid esters in such applications as soaps, coating materials, and food, are known in the art and thus need no further amplification.

The process of the present invention has the additional advantage that it can be carried out simultaneously with reactions involving addition to the double bond such as Diels-Alder reactions and the like.

It is to be understood that the invention as illustrated in the specific example hereinabove is not in any way limited thereto and that many and varied modifications of the invention may be made without departing from the spirit and scope thereof and are included in the present invention as defined in the appended claims.

What is claimed is:
1. A process for the cis to trans isomerization of oleic acid which comprises contacting said oleic acid at 400 to 700° F. with a material consisting essentially of silica gel in the presence of 0.1 to 5% by weight of the oleic acid of water.
2. The process of claim 1 wherein the oleic acid is present in a mixture of fatty acids.
3. The process of claim 1 wherein the concentration of the catalyst is from 0.25 to 5% by weight of the oleic acid.

References Cited

UNITED STATES PATENTS

| 2,378,005 | 6/1945 | Eckey | 260—405.6 |
| 2,388,158 | 10/1945 | Kirschenbauer | 260—405.6 |

FOREIGN PATENTS

| 590,784 | 7/1947 | Great Britain. |

ALEX MAZEL, *Primary Examiner.*

N. S. RIZZO, *Examiner.*

R. GALLAGHER, *Assistant Examiner.*